United States Patent Office 3,404,157
Patented Oct. 1, 1968

3,404,157
SUBSTITUTED PYRROLOINDAZOLE
COMPOUNDS
Francis Joseph McEvoy, Pearl River, N.Y., James Miller
Smith, Jr., Ridgewood, N.J., and Duff Shederic Allen,
Jr., Dobbs Ferry, N.Y., assignors to American Cyanamid Company, Stamford, Conn., a corporation of Maine
No Drawing. Filed Feb. 24, 1965, Ser. No. 435,028
19 Claims. (Cl. 260—310)

ABSTRACT OF THE DISCLOSURE

Compounds of the pyrroloindazole series wherein the ring structure may be substituted in the 1 or 2 and 3, 4, 5, 6, 7, and 8-positions are prepared starting with substituted tetrahydroindoles and ring closing to produce the desired pyrroloindazoles using hydrazine hydrate, methyl hydrazine and similar reagents. The novel compounds are useful as analgesics and anti-inflammatory agents.

The novel compounds of the present invention may be illustrated by the following formulas:

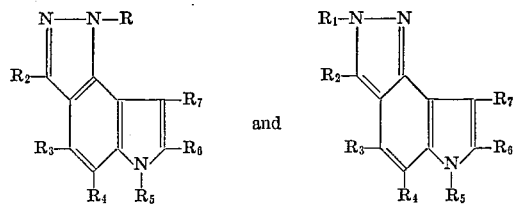

wherein R is selected from the group consisting of hydrogen, lower alkyl and phenyl; $R_1$ is selected from the group consisting of acetyl, benzoyl, and carboxamido; $R_2$ is selected from the group consisting of hydrogen, phenyl, amino, and hydroxyl; $R_3$ and $R_4$ are selected from the group consisting of hydrogen and lower alkyl; $R_5$ is selected from the group consisting of hydrogen, lower alkyl, benzyl, acetyl and chlorobenzoyl; $R_6$ is selected from the group consisting of hydrogen and lower alkyl; $R_7$ is selected from the group consisting of hydrogen, lower alkyl, formyl, hydroxy-lower alkyl, glyoxamido-, lower alkyl carboxy, di(lower alkyl) amino-lower alkyl, lower alkene and nitrovinyl and therapeutically useful acid addition salts.

Many of the pyrroloindazole compounds of this invention form acid addition salts. Since these compounds are valuable therapeutic agents, acid addition salts formed from pharmaceutically acceptable acids are preferred. These addition salts may be formed with both organic and inorganic acids such as hydrochloric acid, nitric acid, citric acid, maleic acid, fumaric acid, succinic acid, sulphuric acid, phosphoric acid, tartaric acid and the like.

The pyrroloindazole compounds of this invention are, in general, crystalline solids, somewhat soluble in the usual organic solvents and relatively insoluble in water. Among the compounds of the present invention are the following:

6-benzyl-2,4,5,6-tetrahydro-7-methylpyrrolo[2,3-g]indazole;
6-benzyl-1,6-dihydro-7-methylpyrrolo[2,3-g]indazole;
1,6-dihydro-7-methylpyrrolo[2,3-g]indazole;
1,6-dihydro-8-formyl-7-methylpyrrolo[2,3-g]indazole;
1,6-dihydro-7,8-dimethylpyrrolo[2,3-g]indazole;
1,6-dihydro-8-hydroxymethyl-7-methylpyrrolo[2,3-g]indazole;
6-benzyl-1,4,5,6-tetrahydro-1,7-dimethylpyrrolo[2,3-g]indazole;
6-benzyl-1,6-dihydro-1,7-dimethylpyrrolo[2,3-g]indazole;
1,6-dihydro-1,7-dimethylpyrrolo[2,3-g]indazole;
1,6-dihydro-N,N,1,7-tetramethylpyrrolo[2,3-g]indazole-8-glyoxamide;
3-allyl-4-keto-2-methyl-4,5,6,7-tetrahydroindole;
3-amino-6-benzyl-1,4,5,6-tetrahydro-7-methylpyrrolo[2,3-g]indazole;
3-amino-6-benzyl-1,6-dihydro-7-methylpyrrolo[2,3-g]indazole;
3-amino-1,6-dihydro-7-methylpyrrolo[2,3-g]indazole;
1-benzyl-4,5,6,7-tetrahydro-2-methyl-4-keto-5-indolecarboxaldehyde oxime;
1-benzyl-5-chloromethylene-4-keto-2-methyl-4,5,6,7-tetrahydroindole;
2-acetyl-6-benzyl-2,6-dihydro-7-methylpyrrolo[2,3-g]indazole;
2-benzoyl-6-benzyl-2,6-dihydro-7-methylpyrrolo[2,3-g]indazole;
6-benzyl-8-dimethylaminomethyl-1,6-dihydro-7-methylpyrrolo[2,3-g]indazole;
6-benzyl-1,6-dihydro-8-formyl-7-methylpyrrolo[2,3-g]indazole;
6-benzyl-7-methyl-8-nitrovinylpyrrolo[2,3-g]indazole;
2-acetyl-2,6-dihydro-7-methylpyrrolo[2,3-g]indazole;
2-benzoyl-2,6-dihydro-7-methylpyrrolo[2,3-g]indazole;
7-methylpyrrolo[2,3-g]indazole-2(6H) carboxamide;
8-dimethylaminomethyl-1,6-dihydro-7-methylpyrrolo[2,3-g]indazole;
6-ethyl-2,4,6-tetrahydro-7-methylpyrrolo[2,3-g]indazole;
6-benzyl-1,4,5,6-tetrahydro-7-methyl-1-phenylpyrrolo[2,3-g]indazole;
6-benzyl-1,6-dihydro-7-methyl-1-phenylpyrrolo[2,3-g]indazole and
1,6-dihydro-7-methyl-1-phenylpyrrolo[2,3-g]indazole.

The term lower alkyl includes saturated branched-chain or straight-chain aliphatic hydrocarbons of 1 to 6 carbon atoms which include groups such as methyl, ethyl, propyl, isopropyl, butyl, isobutyl and the like.

The compounds of this invention are physiologically active and therefore useful in the pharmaceutical field. We have found that they are particularly advantageous as non-addicting analgesics and anti-inflammatory agents in warm-blooded animals. The compounds of this invention were shown to be active in antagonizing the phenyl-p-quinone (PPQ) "writhing" syndrome. The compounds were tested by a modification of the method described by E. Siegmund et al., Proc. Soc. Exptl. Biol. Med., 95, 729 (1957). Briefly the test is described as follows: Two mice are administered the test compound, orally, 30 minutes prior to the intraperitoneal injection of 1 mg./kg. phenyl-p-quinone. Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes any compound that reduces the incidence of writhing to 18 or less (2 standard deviations from historical control) is considered a possible active lead. To confirm activity the test is repeated in another pair of mice. If the incidence of writhing is again reduced to 18 or less, the compound is considered active in the PPQ test, otherwise the compound is rejected. Results with several compounds of this invention are summarized in Table I.

TABLE I

| Compound | Oral dose (mg./kg.) | Number of writhes | | |
|---|---|---|---|---|
| | | Test 1 | Test 2 | Decision |
| 1,6-dihydro-7-methyl-pyrrolo[2,3-g]indazole. | 200 | 0 | 0 | Active. |
| 6-benzyl-1,6-dihydro-8-formyl-7-methylpyrrolo-[2,3-g]indazole. | 200 | 0 | 0 | Do. |
| 6-benzyl-1,6-dihydro-1,7-dimethylpyrrolo[2,3-g]-indazole. | 100 | 13 | 18 | Do. |
| 1,6-dihydro-7,8-dimethyl-pyrrolo[2,3-g]indazole. | 100 | 8 | 17 | Do. |
| 6-benzyl-1,6-dihydro-N,N,1,7-tetramethylpyrrolo-[2,3-g]indazole-8-gly-oxamide. | 100 | 14 | 9 | Do. |

In a test to detect and/or confirm possible analgesic activity, a modification of the method reported by L. O. Randall et al., Arch. Int. Pharmacodyn. CXI, 409 (1957), was used. This consists of applying a steadily increasing pressure to rats hind paws that have been inflamed by an injection of a 20% brewer's yeast suspension. Our procedure is briefly as follows: a volume of 0.1 ml. of 20% suspension of brewer's yeast is injected into the plantar surface of the left hind paw of five rats. One hour later the test drug is administered via stomach tube. The pain threshold is determined one hour after oral dosing by a pressure device which measures the amount of pressure in mm. of mercury required to induce a pain response when applied to the inflamed paw. Air pressure is admitted from an air line to a 10 ml. syringe and to a mercury manometer which is connected by a T-tube. The manometer is calibrated up to a maximum of 300 mm. The syringe is mounted with the plunger downward to which is connected a short bullet-shaped wooden peg with a contact surface of approximately 2 square centimeters. The pressure is applied to the inflamed paw at a rate of 20 mm. of mercury per second. The end point is reached when the rat exhibits a painful response (struggle and/or squeals) or when the maximum of 300 mm. is reached. The mean pain threshold for the test animals is compared to the mean pain threshold of 50 of the most recent starch-dosed control animals.

A 2-stage sequential evaluation procedure has been established which has indicated that increases in the pain threshold of 19% and 27%, respectively, over the mean control value is required for acceptance of a test agent as having possible analgesic activity. Before final acceptance of a test agent, the test is repeated in another 2-stage sequential procedure. The test compound must be accepted in both tests to be considered active by the method. Table II summarizes the results obtained with several of the compounds of this invention.

TABLE II

| Compound | Oral dose (mg./kg.) | Mean Percent Increase in Pain Threshold over Control | | |
|---|---|---|---|---|
| | | Test I (2 stages), percent | Test II (2 stages), percent | Decision |
| 1,6-dihydro-7-methyl-pyrrolo[2,3-g]indazole. | 100 | 75 | 136 | Active. |
| 6-benzyl-1,6-dihydro-8-formyl-7-methyl-pyrrolo[2,3-g]-indazole. | 100 | 48 | 97 | Do. |
| 1,6-dihydro-1,7-dimethylpyrrolo[2,3-g]indazole. | 200 | 66 | 87 | Do. |

In a test to detect possible anti-inflammatory activity, a modification of the method reported by C. A. Winter et al., Proc. Soc. Exptl. Biol. Med. 111, 544 (1962), was used. This test involves the reduction of the edema caused by the injection of a 1% carrageenin solution into the paws of the rats. Briefly, the test is as follows: Rats are administered the test drug by stomach tube. After one hour 0.05 ml. of a 1% carrageenin solution is injected into the plantar surface of the right hind paw. Four hours later the volume of the paw is measured by a water displacement apparatus, a modification of that described by V. W. Adamkiewiez et al., Can. J. of Biochem. and Physiol, 33, 332 (1955). The amount of edema is determined by comparing the volume of water displaced by the paw prior to the injection of carrageenin and the amount of water displaced by the paw four hours after the injection of the phlogistic agent. The amount of edema formed in the paws of test animals is compared to the edema formed in fifty of the most recent control animals dosed orally with 2% starch. A 2-stage sequential evaluation procedure has been established which indicates that reductions of 0.09 ml. and 0.13 ml., respectively, from the mean control value for edema formation is required for acceptance of a test agent as having possible anti-inflammatory activity. Before final acceptance of anti-inflammatory activity, the test is repeated in another 2-stage sequential procedure. The compound must be accepted in both tests to be considered active by the method. Table III summarizes the results obtained with an illustrative compound of this invention.

| Compound | Oral dose (mg./kg.) | Mean ml. reduction from control edema [1] | | |
|---|---|---|---|---|
| | | Test 1 (2 stages) | Test 2 (2 stages) | Decision |
| 1,6-dihydro-1,7-dimethylpyrrolo[2,3-g]-indazole. | 200 | 0.348 | 0.215 | Active. |

[1] Controls show an average edema formation of about 0.70 ml. A difference (reduction) from control of 0.13 ml. edema formation is considered a significant anti-inflammatory effect. This result must be duplicated in a second test. There are 5 rats used for each stage of testing.

The compounds of this invention may be prepared by a novel series of chemical transformations from organic compounds. Starting materials are described by H. Stetter et al., Ann., 655, 20 (1962) (II) and Schedule et al. Berichte 96, 1470 (1963) (III). An example of the compounds of the present invention is 1,6-dihydro-7,8-dimethylpyrrolo[2,3-g]indazole (IX). The preparation of the compound is carried by the following synthesis which is illustrated by Flowsheet A as follows:

FLOWSHEET A

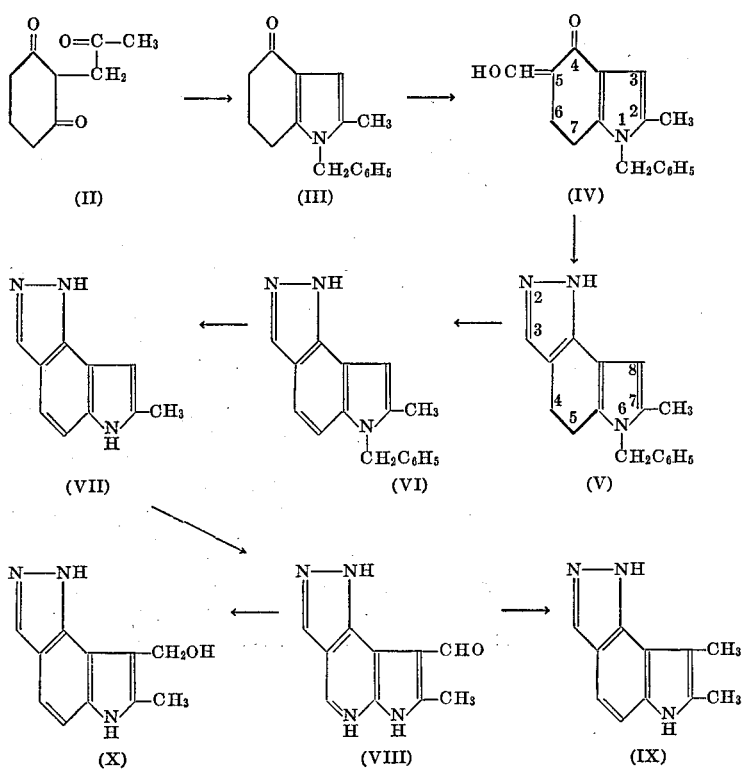

dazole (VI). Debenzylation of compound (VI) with sodium in liquid ammonia gives 1,6-dihydro-7-methylpyrrolo-[2,3-g]indazole (VII) which on treatment with phosphorus oxychloride and dimethyl formamide produces 1,6-

The compound 1-acetonyl-2,6-cyclohexanedione (II) is heated with benzylamine to give 1-benzyl-2-methyl-4-oxo-4,5,6,7-tetrahydroindole (III) which on treatment with alkali and methyl formate gives the known compound, 1-benzyl-5-formyl - 4 - oxo-2-methyl-4,5,6,7-tetrahydroindole (IV). The reaction of compound (IV) with hydrazine hydrate produces 6-benzyl-2,4,5,6-tetrahydro-7-methylpyrrolo[2,3-g]indazole (V) which is dehydrogenated using palladium-on-carbon in refluxing cumene to give 6-benzyl-1,6-dihydro-7-methylpyrrolo[2,3 - g]indihydro-8-formyl-7-methylpyrrolo[2,3-g]indazole (VIII). Reduction of compound (VIII) with lithium aluminum hydride in tetrahydrofuran yields 1,6-dihydro-7,8-dimethylpyrrolo[2,3-g]indazole (IX). Also reduction of compound (VIII) with sodium borohydride in ethanol produces the corresponding alcohol derivative 1,6-dihydro-8-hydroxymethyl-7-methylpyrrolo[2,3-g]indazole (X). The following Flowsheet B illustrates a number of the present compounds prepared from compound (IV) of Flowsheet A.

FLOWSHEET B

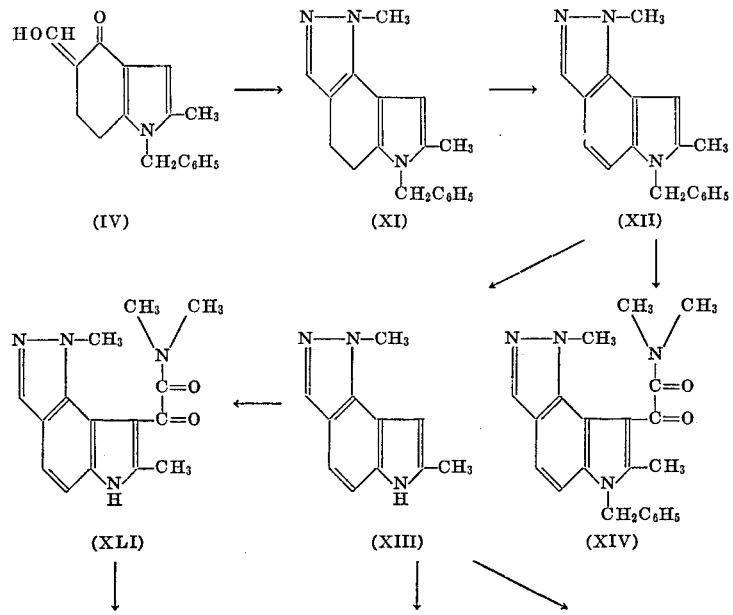

FLOWSHEET B—Continued

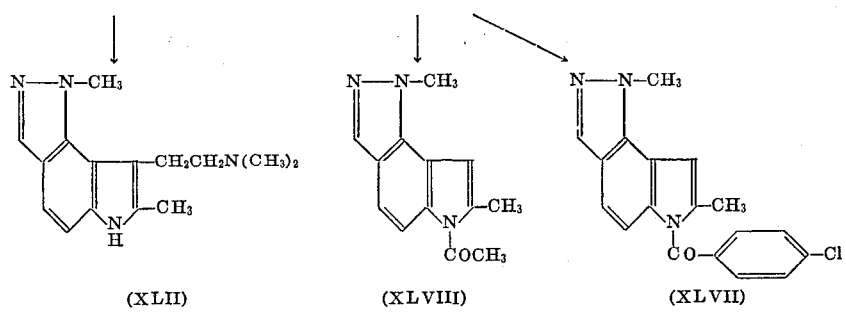

(XLII)   (XLVIII)   (XLVII)

For the preparation of 1,6-dihydro-1,7-dimethylpyrrolo[2,3-g]indazole (XIII), the known hydroxymethylene ketone (IV) is treated with methyl hydrazine to give 6-benzyl - 1,4,5,6 - tetrahydro - 1,7 - dimethylpyrrolo-[2,3-g]indazole (XI) which on treatment with palladium-on-charcoal in refluxing cumene produces 6-benzyl-1,6-dihydro-1,7-dimethylpyrrolo[2,3-g]indazole (XII). Debenzylation of compound (XII) with sodium in liquid ammonia gives compound (XIII). Also, treatment of compound (XII) with oxalyl chloride and dimethylamine in the presence of triethylamine yields 6-benzyl-1,6-dihydro-N,N,1,7 - tetramethylpyrrolo[2,3 - g]indazole - 8 - glyoxamide (XIV).

Starting with compound (IV) of Flowsheet A the following Flowsheet C illustrates the preparation of compounds of the present invention.

Treatment of compound (IV) with hydroxylamine hydrochloride in refluxing ethanol gives the compound 1-benzyl - 5 - cyano - 4 - oxo - 2 - methyl - 4,5,6,7 - tetrahydroindole (XV) from which is obtained, on treatment with hydrazine hydrate in the presence of acetic acid, 3 - amino - 6 - benzyl - 1,4,5,6 - tetrahydro - 7 - methylpyrrolo[2,3-g]indazole (XVI). Dehydrogenation of compound (XVI) with palladium in refluxing alcohol produces 3 - amino - 6 - benzyl - 1,6 - dihydro - 7 - methylpyrrolo[2,3-g]indazole (XVII) which is debenzylated with sodium in liquid ammonia to give compound (XVIII). Treatment of compound (IV) with hydroxylamine hydrochloride in the presence of potassium acetate produces 1 - benzyl - 4,5,6,7 - tetrahydro - 2 - methyl-4-oxo - 5 - indolecarboxaldehyde oxime (XIX). Similarly, treatment of compound (IV) with thionyl chloride gives the chloromethylene derivative compound (XX). The fol-

FLOWSHEET C

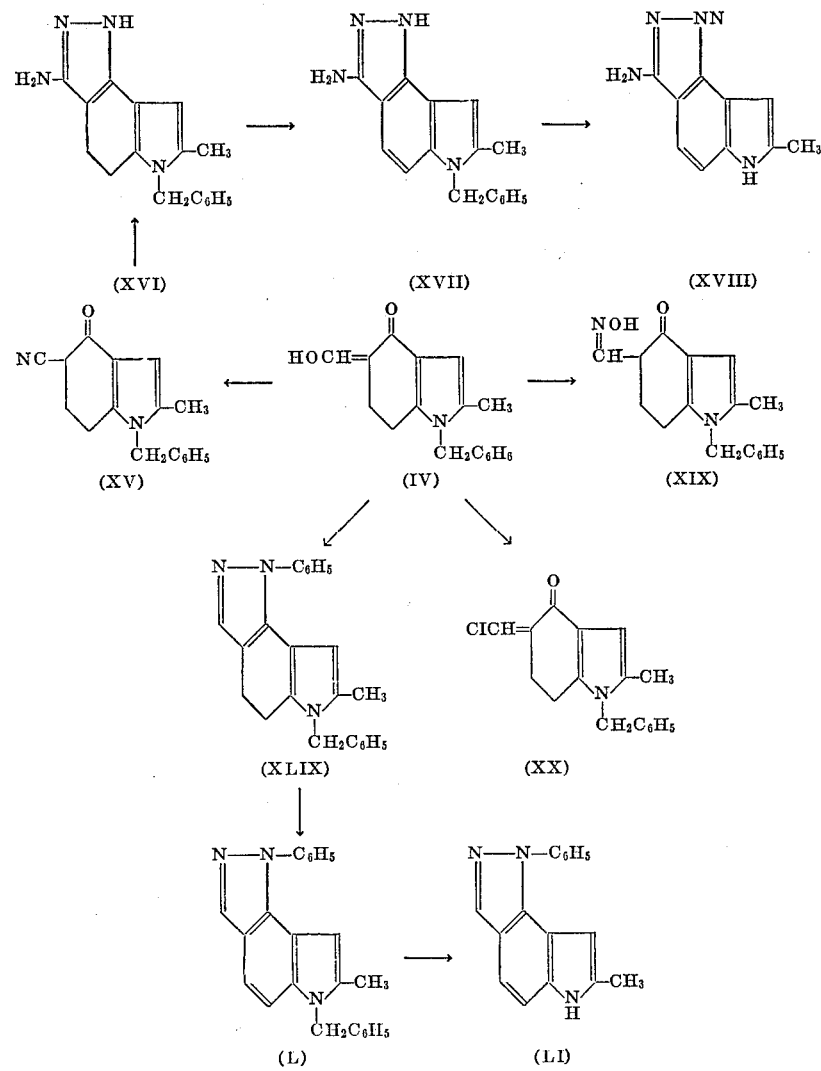

lowing Flowsheet D illustrates the preparation of compounds of the present invention from compound (VI) above.

FLOWSHEET D

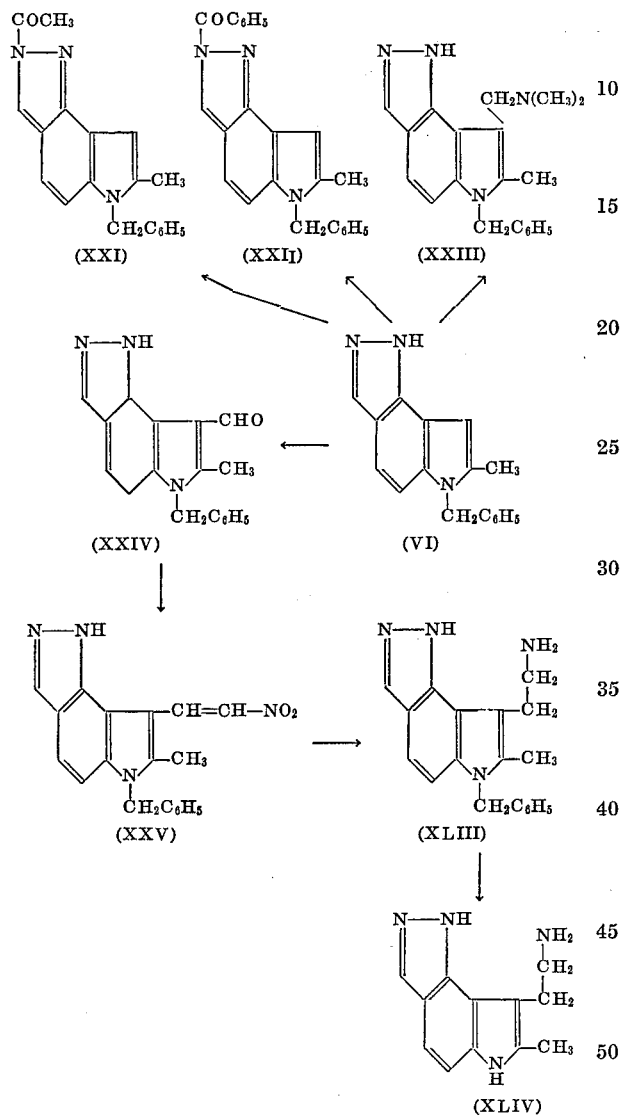

The reaction of the above-described pyrroloindazole (VI) with acetyl chloride produces 2-acetyl-6-benzyl-2,6-dihydro-7-methylpyrrolo[2,3-g]indazole (XXI). Similarly, treatment of compound (VI) with benzoyl chloride yields the corresponding 2-benzoyl derivative (XXII). The 8-dimethylaminomethyl derivative (XXIII) is prepared by the reaction of compound (VI) with paraformaldehyde and dimethylamine. The 8-formyl derivative (XXIV) is obtained from treatment of a compound (VI) with phosphorus oxychloride and dimethylformamide; further reaction of compound (XXIV) with nitromethane in the presence of ammonium acetate and triethylamine yields 6 - benzyl - 7 - methyl - 8 - nitrovinylpyrrolo[2,3 - g]indazole (XXV).

The following Flowsheet E illustrates compounds prepared from compound (VII) Flowsheet A.

FLOWSHEET E

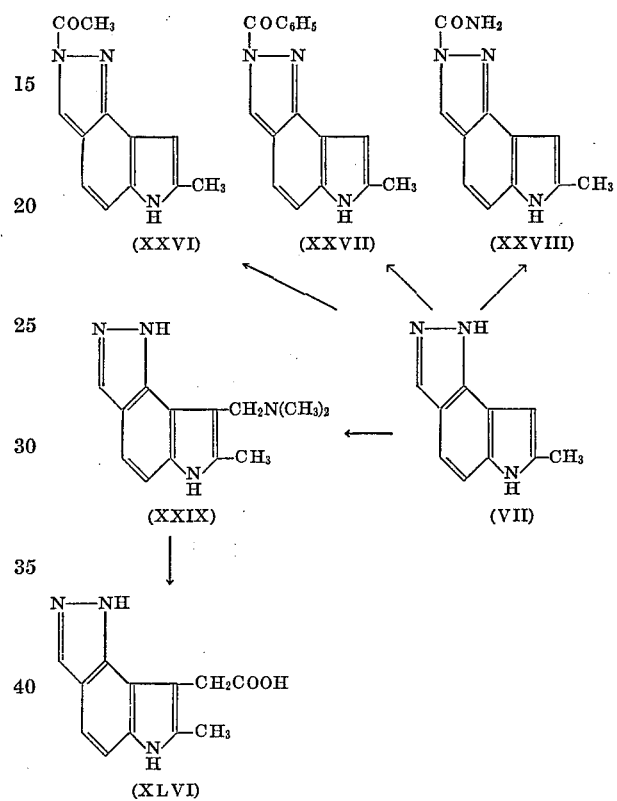

Treatment of 1,6-dihydro-7-methylpyrrolo[2,3-g]indazole (VII) with acetyl chloride gives the corresponding 2-acetyl derivative (XXVI); the 2-benzoyl derivative (XXVII) is obtained by treatment of compound (VII) with benzoyl chloride. The further reaction of compound (VII) with potassium cyanate gives 7-methylpyrrolo[2,3-g]indazole-2(6H) carboxamide (XXVIII). 8-dimethylaminomethyl - 1,6 - dihydro - 7 - methylpyrrolo[2,3 - g]indazole (XXIX) is obtained from the reaction of compound (VII) with dimethylamine hydrochloride and paraformaldehyde. Treatment of XXIX with sodium cyanide in alkaline solution produces the acetic acid derivative XLVI. The following Flowsheet F describes the preparation of compounds from compound (III) of Flowsheet A.

FLOWSHEET F

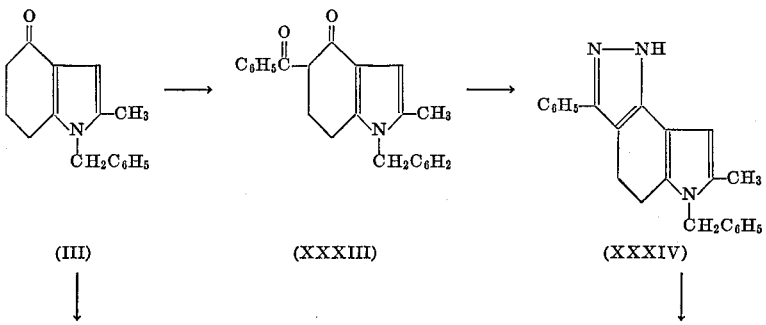

FLOWSHEET F—Continued

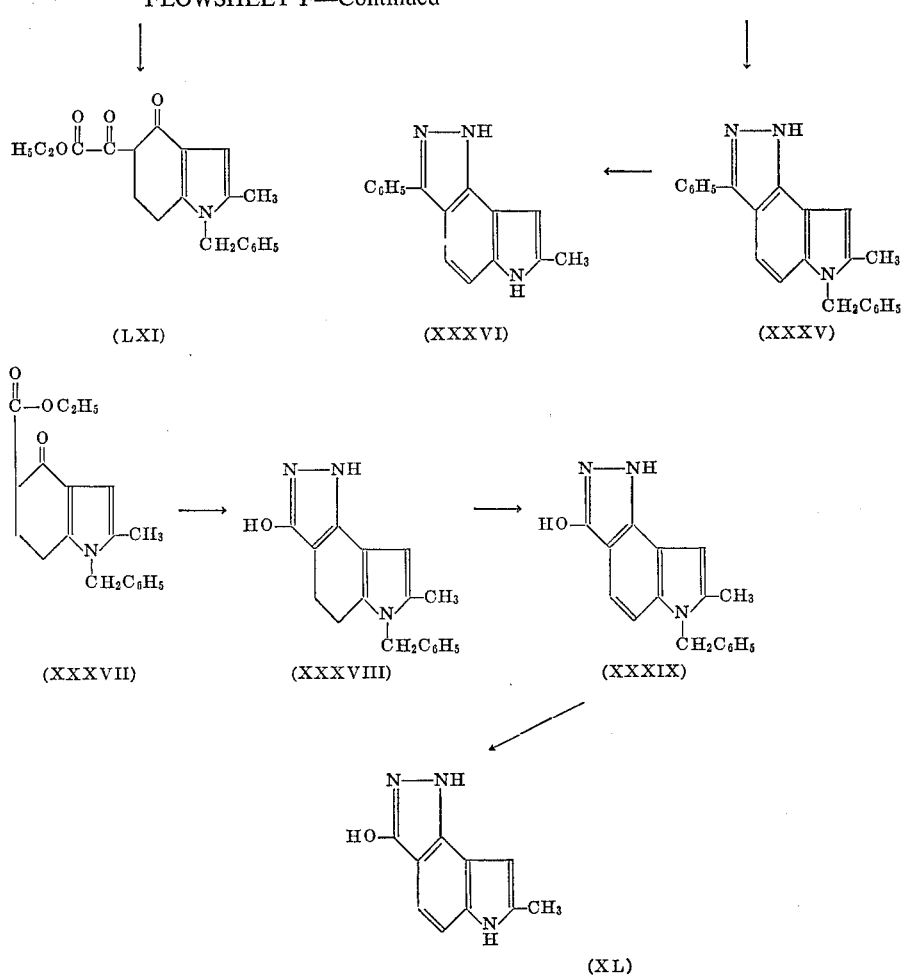

Treatment of the above-described compound (III) with sodium hydride and ethyl benzoate give 5-benzoyl-1-benzyl-4-oxo - 2 - methyl - 4,5,6,7 - tetrahydroindole (XXXIII). The reaction of compound (XXXIII) with hydrazine hydrate produces 6-benzyl-7-methyl-3-phenyl-2,4,5,6 - tetrahydro - 7 - dimethylpyrrolo[2,3-g]indazole (XXXIV) which is dehydrogenated using palladium-on-carbon in refluxing cumene to give the dihydropyrrolo-indazole (XXXV). Debenzylation of compound (XXXV) with sodium in liquid ammonia gives compound (XXXVI). 1,6 - dihydro - 3 - hydroxy - 7 - methylpyrrolo[2,3-g]indazole (XL) is also prepared from compound (III), by reacting with sodium methoxide and ethyl oxalate gives 1 - benzyl - 5 - ethoxyoxalyl - 4 - oxo - 2 - methyl-4,5,6,7-tetrahydroindole (LXI). Heating (LXI) at 145° with powdered soft glass affords 1-benzyl-5-carbethoxy-4-oxo-2-methyl-4,5,6,7-tetrahydroindole (XXXVII).

The tetrahydropyrroloindazole (XXXVIII) formed by the reaction of compound (XXXVII) with hydrazine hydrate is converted to 6-benzyl-1,6-dihydro-3-hydroxy-7-methylpyrrolo[2,3-g]indazole (XXXIX) on treatment with palladium-on-carbon and cumene. Debenzylation of compound (XXXIX) with sodium in liquid ammonia gives compound (XL). The compound 8-(2-aminoethyl) 1,6 - dihydro - N,N,1,7 - tetramethylpyrrolo[2,3 - g] indazole XLII is prepared by treatment of the above-described compound (XIII) with oxalyl chloride and di-methylamine to give the intermediate glyoxamide (XLI), followed by reduction with lithium aluminum hydride (Flowsheet B). The homologous tryptamine analong 8-(2-amino-ethyl)-1,6 - dihydro - 7 - methylpyrrolo[2,3-g] indazole (XLIV) is obtained by reduction of the above-described intermediate compound (XXV) with lithium aluminum hydride and debenzylation of the resulting amine compound (XLIII) with sodium in liquid ammonia (Flowsheet D). 1,6-dihydro - 7 - methylpyrrolo[2,3-g] indazole-8-acetic acid (XLVI) is prepared by treatment of the above-described compound XXXIX with sodium cyanide in alkaline solution (Flowsheet E). 6-(p-chloro-benzoyl) - 1,6 - dihydro - 1,7 - dimethylpyrrolo[2,3-g]-indazole (XLVII) is obtained by treatment of compound (XIII) with sodium hydride and p-chlorobenzoylchloride in dimethyl formamide (Flowsheet B). Similar treatment of XIII with acetyl chloride gives the corresponding acetyl derivative (XLVIII) (Flowsheet B). The reaction of the hydroxymethylene ketone (IV) with phenylhydrazine yields 6 - benzyl - 1,4,5,6 - tetrahydro - 7 - methyl - 1 - phenylpyrrolo[2,3-g]indazole (XLIX) which is transformed to the corresponding pyrroloindazole compound (L) on treatment with palladium-on-carbon in refluxing cumene. The following Flowsheet G describes the preparation of compounds from compound (II) of Flowsheet A.

FLOWSHEET G

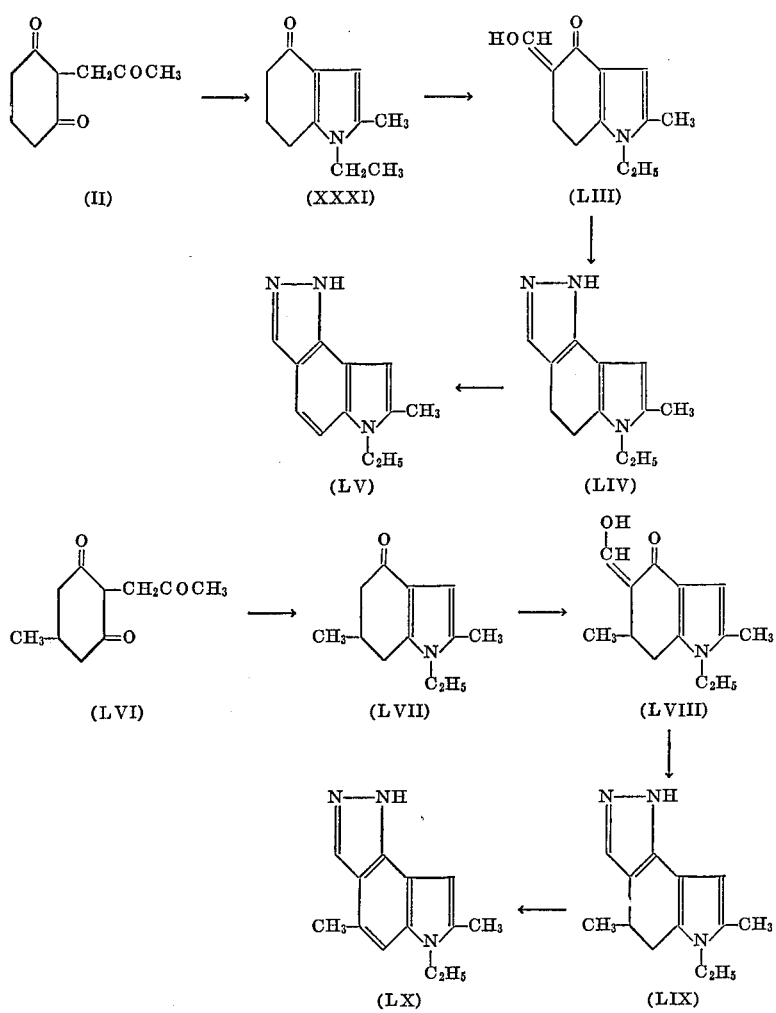

The compound 1-acetonyl-2,6-cyclohexanedione (II) is heated with ethylamine to give 1-ethyl-2 methyl-4-oxo-4,5,6,7-tetrahydroindole (XXXI) which on treatment with alkali and ethyl formate gives 1-ethyl-5-formyl-4-oxo-2-methyl-4,5,6,7-tetrahydroindole (LIII). The reaction of compound (LIII) with hydrazine hydrate produces 6-ethyl-2,4,5,6 - tetrahydro - 7 - methylpyrrolo[2,3-g]indazole (LIV) which is dehydrogenated using palladium-on-carbon in refluxing cumene to give 1,6-dihydro-6-ethyl-7-methylpyrrolo[2,3-g]indazole (LV). The compound 2-acetonyl-5-methyl-1,3 - cyclohexanedione (LVI) when heated with ethylamine gives 2,6-dimethyl-1-ethyl-4-oxo-4,5,6,7-tetrahydroindole (LVII). Compound (LVII) on treatment with alkali and ethyl formate gives 2,6-dimethyl-1-ethyl-5-hydroxymethylene - 4 - oxo - 4,5,6,7 - tetrahydroindole (LVIII). Compound (LVIII) when heated with hydrazine hydrate produces 4,7-dimethyl-6-ethyl-2,4,5,6-tetrahydropyrrolo[2,3-g]indazole (LIX) which is dehydrogenated using palladium-on-carbon in refluxing cumene to give 1,6-dihydro-4,7-dimethyl-6-ethylpyrrolo-[2,3-g]indazole (LX).

The following examples illustrate in detail the preparation of representative pyrroloindazoles and intermediates of the present invention.

Example 1.—Preparation of 6-benzyl-2,4,5,6-tetrahydro-7-methylpyrrolo[2,3-g]indazole (V)

A solution of 2.5 g. of 1-benzyl-5-hydroxymethylene-4-oxo-2-methyl-4,5,6,7-tetrahydroindole (IV) and 0.50 ml. of hydrazine hydrate in 50 ml. of ethanol is heated at refluxing temperatures for ninety minutes. Water (20 ml.) is added to the solution which is then evaporated under reduced pressure at a bath temperature of 45°–50° C. until crystals begin to form. The solution is chilled in an ice bath for thirty minutes and the product is collected as 2.41 g. (98%) of tan crystals, melting point 86°–92° C. Recrystallization from methanol produces an alcoholate (melting point 97°–104° C. gas evolution with previous shrinking).

Example 2.—Preparation of 6-benzyl-1,6-dihydro-7-methylpyrrolo[2,3-g]indazole (VI)

A mixture of 500 mg. of 6-benzyl-2,4,5,6-tetrahydro-7-methylpyrrolo[2,3-g]indazole (Example 1) and 150 mg. of 10% palladium-on-carbon in 10 ml. of cumene is stirred and heated at reflux for two hours. The mixture is filtered through diatomaceous earth while still hot, rinsing with a little benzene. The cooled filtrate deposits 361 mg. (73%) of white needles, melting point 185°–186° C. Two recrystallizations from acetone-hexane raises the melting point to 186°–188° C.

Example 3.—Preparation of 1,6-dihydro-7-methylpyrrolo-[2,3-g]indazole (VII)

Approximately 500 ml. of liquid ammonia is stirred in a Dry Ice-acetone bath and small chips of sodium are added until the blue color first persists. In portions, 2.0 g. of sodium is added and the solution is stirred for 10 minutes. Then 4.0 g. of 6-benzyl-1,6-dihydro-7-methylpyrrolo[2,3-g]indazole (Example 2) is added as rapidly as possible and the solution is stirred for 2 minutes. Ammonium chloride is added portionwise until the blue color disappears (approximately 4 g. of ammonium chloride is used). The solution is stirred in a 25° C. water bath until the ammonia evaporates. To the residue is added 280 ml. of water and the mixture is acidified with 10% acetic acid (about 40 ml.). The residual solid is dissolved in 200 ml. of ethyl acetate. The aqueous solution is extracted twice more with 100 ml. portions of ethyl acetate. The organic extract is washed with saline and sodium bicarbonate solutions, dried with sodium sulfate and evaporated under reduced pressure to a dark green glass. A solution of the glass in 30 ml. of acetone and 150 ml. of methylene chloride is stirred with 32 g. of synthetic magnesium silicate for 5 minutes. The mixture is filtered through an 8 g. pad of synthetic magnesium silicate, washing with three 80 ml. portions of 10% acetone-methylene chloride. The filtrate and washes are evaporated to dryness under reduced pressure leaving a white solid residue. Crystallization from acetone-hexane gives 1.72 g. of white powder, melting point 215°–220° C. A second crop of material weighing 368 mg. (melting point 213°–215° C.) is obtained by concentration of the mother liquors raising the yield to 2.09 g. (80%).

Example 4.—Preparation of 1,6-dihydro-8-formyl-7-methylpyrrolo[2,3-g]indazole (VIII)

To 5 ml. of dimethylformamide stirred at 0° is added 0.76 ml. of phosphorus oxychloride. The mixture is stirred for 10 minutes and then a solution of 700 mg. of 1,6-dihydro-7-methylpyrrolo[2,3-g]indazole (Example 3) in 15 ml. of dimethylformamide is added dropwise over a period of 10 minutes. The mixture is stirred at 0°–5° C. for 15 minutes and allowed to come to room temperature for 2 hours. The solution is again cooled to 5° C. and poured onto crushed ice. To the mixture is added 33.5 ml. of 10% sodium hydroxide and the solution is rapidly heated to a boil. A gelatinous material first forms and then turns to a white solid. The mixture is cooled in an ice bath for 30 minutes. The product is collected and washed with water affording 699 mg. (86%), melting point 322°–326° C. dec. A sample is recrystallized twice from methanol and twice from acetone and melts at 324°–328° C. dec.

Example 5.—Preparation of 1,6-dihydro-7,8-dimethylpyrrolo[2,3-g]indazole (IX)

To a suspension of 1.2 g. of 1,6-dihydro-8-formyl-7-methylpyrrolo[2,3-g]indazole (Example 4) in 160 ml. of tetrahydrofuran is added 2.8 g. of lithium aluminum hydride in an argon atmosphere. The mixture is refluxed for 4 hours, then cooled and stirred in an ice bath while 20 ml. of a saturated aqueous solution of sodium potassium tartrate is added dropwise. The mixture is filtered and the filter cake washed with tetrahydrofuran. The filtrate is evaporated to dryness under reduced pressure. The residue is dissolved in 5 ml. of acetone and placed on a chromatography column containing 100 g. of synthetic magnesium silicate wet with methylene chloride. Elution of the column with methylene chloride and evaporation of the eluates affords 0.82 g. of white solid. Crystallization from acetone-hexane yields 507 mg. of white plates, melting point 242–244° C.

Example 6.—Preparation of 1,6-dihydro-8-hydroxymethyl-7-methylpyrrolo[2,3-g]indazole (X)

To a stirred suspension of 950 mg. of 1,6-dihydro-8-formyl-7-methylpyrrolo[2,3-g]indazole (Example 4) in 15 ml. of absolute ethanol is added a solution of 950 mg. of sodium borohydride in 30 ml. of absolute ethanol. The suspension is stirred for 2 hours at which time solution is essentially complete. The mixture is filtered to remove a trace of solid and 400 ml. of water is added to the filtrate. The solution is cooled in an ice bath for 2 hours, then filtered affording 750 mg. of white crystals, melting point 198°–200° C.

Example 7.—Preparation of 6-benzyl-1,4,5,6-tetrahydro-1,7-dimethylpyrrolo[2,3-g]indazole (XI)

A solution of 13.36 g. of 1-benzyl-5-formyl-4-oxo-2-methyl-4,5,6,7-tetrahydroindole (IV) and 3.3 ml. of methyl hydrazine in 200 ml. of absolute ethanol is heated at reflux for 90 minutes, then diluted with 300 ml. of water and extracted with methylene chloride. The extract is dried with magnesium sulfate and evaporated to dryness under reduced pressure. The residue is dissolved in 250 ml. of 5% acetone-methylene chloride and stirred with 50 g. of synthetic magnesium silicate. The mixture is filtered and the filter cake washed with three 80 ml. portions of 5% acetone-methylene chloride. The organic solution is evaporated to dryness under reduced pressure. The residual gum is dissolved in 100 ml. of ether and petroleum ether (30°–60° C.) is added to turbidity affording 7.34 g. of white crystals, melting point 95°–97° C.

Example 8.—Preparation of 6-benzyl-1,6-dihydro-1,7-dimethylpyrrolo[2,3-g]indazole (XII)

A stirred solution of 7.34 g. of 6-benzyl-1,4,5,6-tetrahydro-1,7-dimethylpyrrolo[2,3-g]indazole (Example 7) in 125 ml. of cumene and 1.25 g. of 10% palladium-on-charcoal is heated at reflux for 2 hours. The mixture is filtered through diatomaceous earth and the filtrate evaporated under reduced pressure. The residual gummy solid is dissolved in methylene chloride and placed on a chromatography column containing 700 g. of synthetic magnesium silicate wet with methylene chloride. The eluates are evaporated and the residue crystallized from methylene chloride-petroleum ether (20°–60°) affording 4.13 g. of white prisms, melting point 114°–116° C.

Example 9.—Preparation of 1,6-dihydro-1,7-dimethylpyrrolo[2,3-g]indazole (XIII)

Approximately 250 ml. of liquid ammonia is stirred in a Dry Ice-acetone bath and small chips of sodium are added until the blue color first persists. In portions, 2.0 g. of sodium is added and the solution is stirred for 10 minutes. The 4.1 g. of 6-benzyl-1,6-dihydro-1,7-dimethylpyrrolo[2,3-g]indazole (Example 8) is added as rapidly as possible and the solution is stirred for 6 minutes. Ammonium chloride is added portionwise until the blue color disappears. The solution is stirred in a 25° C. water bath until the ammonia evaporates. To the residue is added 200 ml. of water and the insoluble material is collected as 2.56 g. of white solid melting point 180°–190° C. The crude material is dissolved in 250 ml. of 2% acetonmethylene chloride and stirred with 100 g. of synthetic magnesium silicate. The mixture is filtered and the filter cake washed with four 125 ml. portions of 2% acetone-methylene chloride. The filtrate is evaporated under reduced pressure leaving a white solid residue weighing 2.45 g. Crystallization of this material from acetone-hexane affords 1.25 g. of white powder, melting point 209°–214° C.

Example 10.—Preparation of 6-benzyl-1,6-dihydro-N,N,1,7-tetramethylpyrrolo[2,3-g]indazole-8 - glyoxylamide (XIV)

To a stirred, ice-cooled solution of 275 mg. of 6-benzyl-1,6-dihydro - 1,7 - dimethylpyrrolo[2,3 - g]indazole (Example 8) in 20 ml. of methylene chloride is added 0.28 ml. of triethylamine and 0.10 ml. of oxalyl chloride. The dark red solution is stirred in an ice bath for 30 minutes. To the reaction mixture is added 10 ml. of a saturated solution of dimethylamine in methylene chloride. The clear solution is stirred for 10 minutes, washed with water, dried with magnesium sulfate and evaporated under reduced pressure. The 385 mg. of residual gum is triturated with 20 ml. of ether affording 141 mg. of solid, melting point 193°–195° C. Two recrystallization from acetone-hexane raises the melting point to 199°–201° C.

Example 11.—Preparation of 6-p-chlorobenzoyl-1,6-dihydro-1,7-dimethylpyrrolo[2,3-g]indazole (XLVII)

To a solution of 1.85 g. of 1,6-dihydro-1,7-dimethylpyrrolo[2,3-g]indazole XIII (Example 9) in 20 ml. of dried dimethyl formamide is added, in portions, 0.50 g. of a 50% dispersion of sodium hydride in oil. The mixture is cooled in an ice bath and 1.2 ml. of p-chlorobenzoylchloride is added over a period of one hour. After 6 days at 0° C., the mixture is filtered and the filtrate is added to dilute acetic acid and extracted with benzene. The organic extracts are washed thoroughly with water, dried over magnesium sulfate and concentrated under reduced pressure. The partially crystalline residue on addition of ether affords 0.518 g. of starting material. Crystallization of the residue obtained on evaporation, of the mother liquors from ether-petroleum ether affords 1.109 g. crystals, melting point 160°–170° (first crop) and 0.545 g. crystals (second crop). The second crop material is chromatographed on silica gel. Elution with methylene chloride affords 0.285 g. yellow plates, melting point 162°–167° C.

Example 12.—Preparation of 3-amino-6-benzyl-1,4,5,6-tetrahydro-7-methylpyrrolo[2,3-g]indazole (XVI)

A solution of 500 mg. of 1-benzyl-5-hydroxymethylene-2-methyl-4-oxo - 4,5,6,7 - tetrahydroindole (IV) and 143 mg. of hydroxylamine hydrochloride in 20 ml. of ethanol is heated at reflux temperature for 18 hours, diluted with water and evaporated under reduced pressure until the alcohol is removed. A methylene chloride extract of the residual aqueous solution is washed with saline, dried and concentrated. Crystallization of the residue from acetone-hexane gives 1-benzyl-5-cyano - 4-oxo-2 - methyl - 4,5,6,7-tetrahydroindole (XV) white crystals, melting point 98°–99° C.

To a solution of 1.02 g. of (XV) in 25 ml. of benzene is added 0.278 ml. of hydrazine hydrate and 0.43 ml. of glacial acetic acid. The solution is heated under reflux for 18 hours, cooled and 20 ml. of 6 N hydrochloric acid is added. The insoluble gum thus formed is separated and stirred with 20 ml. of methylene chloride. The resultant solid is collected and crystallized from ethanol-hexane affording white crystals, melting point 241°–244° C. of hydrochloride.

The free base is obtained by dissolving the above hydrochloride in methanol, diluting with water and making the solution alkaline with ammonium hydroxide affording white crystals, melting point 102°–110° C.

Example 13.—Preparation of 3-amino-6-benzyl-1,6-dihydro-7-methylpyrrolo[2,3-g]indazole (XVII)

To a solution of 100 mg. of 3-amino-6-benzyl-1,4,5,6-tetrahydro-7-methylpyrrolo[2,3-g]indazole hydrochloride (Example 12) in 15 ml. of absolute ethanol is added 100 mg. of 10% palladium-on-carbon. The mixture is stirred and heated at reflux in an argon atmosphere for 40 hours, then filtered and evaporated under reduced pressure. The residual gum is crystallized from ethanol-heptane affording 48 mg. of 3-amino-6-benzyl-1,6-dihydro-7-methylpyrrolo[2,3-g]indazole hydrochloride, melting point 275°–282° C.

Example 14.—Preparation of 3-amino-1,6-dihydro-7-methylpyrrolo[2,3-g]indazole (XVIII)

Small pieces of sodium are added to 150 ml. of liquid ammonia stirred in an acetone-Dry Ice bath until a blue color persists, then 0.500 g. of sodium is added portionwise. The mixture is stirred for 5 minutes and 1.20 g. of 3-amino-6-benzyl-1,6-dihydro-7-methylpyrrolo[2,3-g]indazole (Example 13) is added. The mixture is stirred for 5 minutes and ammonium chloride is added portionwise until the blue color is discharged. The ammonia is evaporated and the residue is triturated with water. The residue is dissolved in methylene chloride and chromatographed on silica gel to give 0.080 g. of crystalline product.

Example 15.—Preparation of 1-benzyl-4,5,6,7-tetrahydro-2-methyl-4-oxo-5-indolecarboxaldehyde oxime (XIX)

To a solution of 500 mg. of 1-benzyl-5-hydroxy-methylene-4-oxo-2 - methyl - 4,5,6,7 - tetrahydroindole and 143 mg. of hydroxylamine hydrochloride in 20 ml. of ethanol is added 400 mg. of potassium acetate. The solution is heated at reflux for 75 minutes, then diluted with water and evaporated under reduced pressure to remove most of the alcohol. A gum separates from which the water is decanted. The residual gum is dissolved in hot methanol and water is added to turbidity. The solution is allowed to remain at room temperature for three days and the resultant crystals are collected and washed with water affording 321 mg. (61%) of amber crystals, melting point 135°–150° C. Three recrystallizations from acetone-hexane raises the melting point to 159°–161° C.

Example 16.—Preparation of 1-benzyl-5-chloromethylene-4-oxo-2-methyl-4,5,6,7-tetrahydroindole (XX)

To a stirred solution of 330 mg. of 1-benzyl-5-formyl-4-oxo-2-methyl-4,5,6,7-tetrahydroindole (IV) in 10 ml. of benzene protected from moisture is added 0.117 ml. of thionyl chloride. The solution is stirred for 15 minutes and filtered affording 180 mg. of 1-benzyl-5-chloromethylene-4-oxo-2-methyl - 4,5,6,7 - tetrahydroindole, melting point 157°–161° C. dec.

Example 17.—Preparation of 2-acetyl-6-benzyl-2,6-dihydro-7-methylpyrrolo[2,3-g]indazole (XXI)

To a stirred, ice-cooled solution of 522 mg. of 6-benzyl-1,6-dihydro-7-methylpyrrolo[2,3-g]indazole (Example 2) in 2 ml. of pyridine is added 0.156 ml. of acetyl chloride. The solution is stirred at room temperature for 10 minutes, then diluted with 20 ml. of water affording 587 mg. of pale yellow solid, melting point 135°–140° C. Several recrystallizations from acetone-hexane raises the melting point 140°–147° C.

Example 18.—Preparation of 2-benzoyl-6-benzyl-2,6-dihydro-7-methylpyrrolo[2,3-g]indazole (XXII)

To a stirred, ice-cooled solution of 522 mg. of 6-benzyl-1,6-dihydro-7-methylpyrrolo[2,3-g]indazole (Example 2) in 4 ml. of pyridine is added 0.258 ml. of benzoyl chloride. The mixture is stirred at room temperature for 10 minutes, then diluted with 10 ml. of water affording 697 mg. of bright yellow solid, melting point 192°–194° C. Two recrystallizations from acetone-hexane raises the melting point to 197°–201° C.

Example 19.—Preparation of 6-benzyl-8-dimethylaminomethyl-1,6 - dihydro - 7 - methylpyrrolo[2,3-g]indazole (XXIII)

A mixture of 5.22 g. of 6-benzyl-1,6-dihydro-7-methylpyrrolo[2,3-g]indazole (Example 2), 2.45 g. of dimethylamine hydrochloride and 770 mg. of paraformaldehyde in 200 ml. of methanol is stirred and refluxed for 44 hours. The solution is filtered free of some insoluble material and concentrated to one-half its volume, then diluted with 200 ml. of water. The aqueous solution is washed several times with ethyl acetate and evaporated for a short time to remove entrapped organic solvent. The aqueous solution is stirred and is made alkaline with dilute ammonium hydroxide affording 3.11 g. of white crystals, melting point 157°–159° C. A similar preparation recrystallized several times from ethyl acetate melts at 159°–163° C.

Example 20.—Preparation of 6-benzyl-1,6-dihydro-8-formyl-7-methylpyrrolo[2,3-g]indazole (XXIV)

To 5 ml. of dimethylformamide stirred at 0° is added 0.176 ml. of phosphorus oxychloride. The mixture is stirred for 10 minutes and then a solution of 1.06 g. of 6-benzyl-1,6-dihydro-7-methylpyrrolo[2,3-g]indazole (Example 2) in 15 ml. of dimethylformamide is added dropwise. The mixture is stirred 0–5° C. for 10 minutes, at room temperature for 10 minutes and heated at reflux for 20 minutes. The solution is cooled and poured onto crushed ice. With stirring is added 10% sodium hydroxide dropwise until a color change from brown to white is noticed. The remainder of the 33.5 ml. of 10% sodium hydroxide is added all at once and the solution is brought rapidly to a boil. The solids do not dissolve and the mixture is cooled in an ice bath for 30 minutes. The solid is collected and washed with water affording 1.10 g. of tan powder, melting point 148°–152° C. A sample is recrystallized twice from methanol-water and four times from methanol yielding white crystals, melting point 176°–178° C.

Example 21.—Preparation of 6-benzyl-7-methyl-8-nitrovinylpyrrolo[2,3-g]indazole (XXV)

A solution of 500 mg. of 6-benzyl-8-formyl-7-methylpyrrolo[2,3-g]indazole (Example 20), 100 mg. of ammonium acetate and 0.5 ml. of triethylamine in 20 ml. of nitromethane is heated at reflux for 82 hours. The solution is evaporated under reduced pressure and the residue is dissolved in methylene chloride. The organic solution is washed with saline solution, dried with magnesium sulfate and evaporated under reduced pressure. The residual gum is dissolved in methylene chloride and placed on a chromatography column containing 40 g. of synthetic magnesium silicate wet with methylene chloride. The product is eluted with 1% acetone-methylene chloride. Evaporation of the eluates produces a yellow gum which is crystallized from ether-petroleum ether (30°–60°) affording yellow crystals, melting point 184°–186° C.

Example 22.—Preparation of 2-acetyl-2,6-dihydro-7-methylpyrrolo[2,3-g]indazole (XXVI)

To a stirred, ice-cooled solution of 200 mg. of 1,6-dihydro-7-methylpyrrolo[2,3-g]indazole (Example 3) in 3 ml. of pyridine is added dropwise 0.084 ml. of acetyl chloride. The solution is stirred at room temperature for 3 hours then diluted with water affording 168 mg. of pale yellow crystals, melting point 179°–182° C. A sample recrystallized several times from acetone-hexane melts at 182°–184° C.

Example 23.—Preparation of 2-benzoyl - 2,6 - dihydro-7-methylpyrrolo[2,3-g]indazole (XXVII)

To a stirred, ice-cooled solution of 200 mg. of 1,6-dihydro-7-methylpyrrolo[2,3-g]indazole (Example 3) in 3 ml. of pyridine is added dropwise 0.138 ml. of benzoyl chloride. The solution is stirred in an ice bath for 15 minutes and at room temperature for 15 minutes, then diluted with 25 ml. of water affording 302 mg. of yellow crystals, melting point 172°–175° C. Two recrystallizations from acetone-hexane raise the melting point to 174°–176° C.

Example 24.—Preparation of 7-methylpyrrolo[2,3-g]indazole 2(6H)carboxamide (XXVIII)

To a stirred, ice-cooled solution of 500 mg. of 1,6-dihydro-7-methylpyrrolo[2,3-g]indazole (Example 3) in 15 ml. of methanol and 592 mg. of potassium cyanate in 10 ml. of water is added 0.6 ml. of concentrated hydrochloric acid dropwise. The mixture is stirred in an ice-bath for 1 hour and then filtered affording 350 mg. of white crystals that soften at 140° C. and melt at 209°–211° C. A sample recrystallized from acetone-water exhibits a double melting point, 130–132; 204–208° C. The nuclear magnetic resonance spectrum shows the crystals to be solvated, containing ⅓ mole of acetone.

Example 25.—Preparation of 8-dimethylaminomethyl-1,6-dihydro-7-methylpyrrolo[2,3-g]indazole (XXIX)

A mixture of 2.0 g. of 1,6-dihydro-7-methylpyrrolo[2,3-g]indazole (Example 3), 1.45 g. of dimethylamine hydrochloride and 467 mg. of paraformaldehyde in 40 ml. of methanol is heated under reflux for 4 hours. The solution is filtered free of some solid material and the filtrate is diluted with water. The methanol is evaporated under reduced pressure and the aqueous solution is filtered to remove some solid material. The aqueous filtrate is made alkaline with ammonium hydroxide affording 2.12 g. of white solid. A solution of this material in methylene chloride is passed through 15 g. of synthetic magnesium silicate. Removal of the solvent under reduced pressure affords 1.78 g. of white solid. One recrystallization of this material from acetone-hexane gives white crystals, melting point 188° C.

Example 26.—Preparation of 6-benzyl-1,4,5,6-tetrahydro-7-methyl-1-phenylpyrrolo[2,3-g]indazole (XLIX)

A solution of 5.35 g. of 1-benzyl - 5 - formyl-4-oxo-2-methyl - 4,5,6,7 - tetrahydroindole (IV) and 2.45 ml. of phenylhydrazine in 80 ml. of absolute ethanol is heated at reflux for 18 hours. The solution is cooled, diluted with water and extracted with methylene chloride. The organic extract is dried with magnesium sulfate and evaporated under reduced pressure. The residual gum is crystallized from ethyl ether affording 4.9 g. of 6-benzyl-1,4,5,6-tetrahydro - 7 - methyl-1-phenylpyrrolo[2,3-g]indazole, melting point 155°–157° C.

Example 27.—Preparation of 1,6-dihydro - 6 - benzyl-7-methyl-1-phenylpyrrolo[2,3-g]indazole (L)

A solution of 1.0 g. of 6-benzyl-1,4,5,6-tetrahydro-7-methyl-1-phenylpyrrolo[2,3-g]indazole (Example 26) in 25 ml. of cumene is stirred and heated at reflux with 300 mg. of 10% palladium-on-charcoal for 2 hours. The hot solution is filtered through diatomaceous earth and the filtrate evaporated under reduced pressure. The residual dark oil is slurried with 50 ml. of petroleum ether (30°–60°) and the resultant gum is separated, dissolved in methylene chloride and stirred with 20 g. of synthetic magnesium silicate. The mixture is filtered and the filtrate evaporated under reduced pressure. The residual gum is crystallized from 25 ml. of methanol affording 0.32 g. of 1,6-dihydro-6-benzyl - 7 - methyl-1-phenylpyrrolo[2,3-g]indazole, melting point 152°–154° C.

Example 28.—Preparation of 1,6-dihydro - 7 - methyl-1-phenylpyrrolo[2,3-g]indazole (LI)

Small chips of sodium are added to approximately 200 ml. of liquid ammonia stirred in an acetone-Dry Ice bath until the blue color persists, then 600 mg. of sodium is added portionwise. The mixture is stirred for 10 minutes and then 1.49 g. of 6-benzyl-1,6-dihydro-7-methyl-1-phenylpyrrolo[2,3-g]indazole (Example 27) is added. The mixture is stirred for 4 minutes and ammonium chloride is added portionwise until the blue color is discharged. The ammonia is evaporated and the residual solid is triturated with 200 ml. of water. The 1.36 g. of crude product thus obtained is dissolved in benzene and placed on a chromatography column containing 85 g. of silica gel wet with benzene. The 1,6-dihydro-7-methyl-1-phenylpyrrolo[2,3-g]indazole is obtained by evaporation of the 10% ether-benzene eluates and crystallized from acetone-hexane affording white crystals, melting point 215°–218° C.

Example 29.—Preparation of 3-allyl-4-oxo-2-methyl-1,4,5,6,7-tetrahydroindole (LII)

To a solution of 500 mg. of 4-oxo-2-methyl-4,5,6,7-tetrahydroindole in 25 ml. of t-butanol containing 131 mg. of potassium is added 0.30 ml. of allyl bromide in an argon atmosphere. The mixture is stirred at room temperature for 48 hours and then evaporated under reduced pressure. The residue is extracted with benzene and the benzene extract is placed on a chromatography column containing 100 g. of silica gel wet with benzene. By evaporation of the 1:4 ether-benzene eluates there is obtained 250 mg. of a gum which is crystallized from ether-hexane affording 163 mg. of white needles, melting point 156°–158° C.

Example 30.—Preparation of 1,6-dihydro-7-methylpyrrolo[2,3-g]indazole-8-acetic acid (XLVI)

A mixture of 0.500 g. of 1,6-dihydro-8-dimethylaminomethyl - 7 - methylpyrrolo[2,3-g]indazole (Example 25), 0.540 g. of sodium cyanide, 1.2 ml. of 40% sodium hydroxide solution, 10 ml. of water and 10 ml. of ethanol is heated at reflux for 65 hours. The mixture is diluted with water and extracted with ethyl acetate. The aqueous layer is carefully acidified and cooled in an ice bath. The product 0.363 g. is separated by filtration.

Example 31.—Preparation of 1-benzyl-5-ethoxyoxalyl-4-oxo-2-methyl-4,5,6,7-tetrahydroindole (LXI)

To an ice-cooled solution of 9.58 g. of 1-benzyl-4-oxo-2-methyl-4,5,6,7-tetrahydroindole (IV) and 5.95 ml. of ethyl oxalate in 500 ml. of dry benzene covered with argon is added 2.6 g. of sodium methoxide. The mixture is stirred at room temperature for three hours and then extracted with three 60 ml. portions of iced 5% sodium hydroxide. The cold alkaline extract is washed with ether. The alkaline solution is stirred with 250 ml. of methylene chloride and acidified with 100 ml. of 6 N hydrochloric acid. The organic solution is washed with water, dried with magnesium sulfate and evaporated under reduced pressure. The residual brown cake is dissolved in 200 ml. of methylene chloride and stirred with 65 g. of synthetic magnesium silicate. The solution is filtered and the filter cake is washed with 500 ml. of methylene chloride. The filtrate is evaporated to dryness and the residual yellow cake is crystallized from methylene chloride-hexane affording 5.85 g. of light yellow crystals, melting point 90°–91° C.

Example 32.—Preparation of 1-benzyl-5-carbethoxy-4-oxo-2-methyl-4,5,6,7-tetrahydroindole (XXXVII)

A mixture of 500 mg. of 1-benzyl-5-ethoxyoxalyl-4-oxo-2-methyl-4,5,6,7-tetrahydroindole (Example 31) and 250 mg. of powdered soft glass is stirred and heated at 145° C. for 5½ hours. The mixture is dissolved in benzene and filtered. The chilled benzene solution is washed with three 20 ml. portions of iced 5% sodium hydroxide solution, dried with magnesium sulfate and evaporated under reduced pressure. The residual brown gum is dissolved in 10% acetone-methylene chloride mixture and stirred with synthetic magnesium silicate. The mixture is filtered and the filtrate evaporated under reduced pressure affording 340 mg. of 1-benzyl-5-carbethoxy - 4-oxo-2-methyl - 4,5,6,7-tetrahydroindole as a clear gum.

Example 33.—Preparation of 6-benzyl-3,4,5,6-tetrahydro-7-methylpyrrolo[2,3-g]indazole-3-ol (XXXVIII)

A solution of 340 mg. of 1-benzyl-5-carbethoxy-4-oxo-2-methyl-4,5,6,7-tetrahydroindole (Example 37) and 0.06 ml. of hydrazine hydrate in 20 ml. of ethanol is heated at reflux for 4 hours. The solution is cooled, diluted with water and concentrated under reduced pressure. The residual aqueous solution is extracted with methylene chloride and the extracts are dried with magnesium sulfate and evaporated under reduced pressure. The resultant gummy solid is triturated with ether affording white crystals, melting point 267°–277° C. dec.

Example 34.—Preparation of 6-benzyl-1,6-dihydro-7-methylpyrrolo[2,3-g]indazole-3-ol (XXXIX)

A solution of 1.30 g. of 6-benzyl-3,4,5,6-tetrahydro-7-methylpyrrolo[2,3-g]indazole-3-ol (Example 33) in 30 ml. of cumene is stirred and heated at reflux with 0.250 g. of 10% palladium-on-carbon for 2 hours. The hot solution is filtered through diatomaceous earth and the filtrate evaporated under reduced pressure. The residue is dissolved in methylene chloride and stirred with 20 g. of synthetic magnesium silicate. The mixture is filtered and the filtrate evaporated under reduced pressure. The residue is crystallized from methanol-water affording 6-benzyl-1,6-dihydro-7-methylpyrrolo[2,3-g]indazole-3-ol.

Example 35.—Preparation of 1,6-dihydro-7-methylpyrrolo[2,3-g]indazole-3-ol (XL)

A mixture of 0.830 g. of 6-benzyl-1,6-dihydro-7-methylpyrrolo[2,3-g]indazole-3-ol (Example 34), 0.7 ml. of freshly distilled dihydropyran and 0.50 g. of p-toluenesulfonic acid in 20 ml. of benzene is stirred at room temperature for 12 hours. The benzene solution is extracted with dilute sodium bicarbonate, washed with water, dried over sodium sulfate, and evaporated under reduced pressure affording a yellow oil. Small chips of sodium are added to 150 ml. of liquid ammonia stirred in an acetone-Dry Ice bath until a blue color persists, then 0.400 g. of sodium is added portionwise. The mixture is stirred for 10 minutes and a solution of the above yellow oil in 20 ml. of ether is added. The mixture is stirred for 5 minutes and ammonium chloride is added portionwise until the blue color is discharged. The ammonia is evaporated and the residue is dissolved in methanol-water. The solution is acidified with dilute hydrochloric acid and stirred at room temperature. The product, 1,6-dihydro-7-methylpyrrolo[2,3-g]indazole-3-ol, separates and is collected by filtration.

Example 36.—Preparation of 1,6-dihydro-N,N,1,7-tetramethylpyrrolo[2,3-g]indazole-8-glyoxylamide (XLI)

To a stirred ice-cooled solution of 0.205 g. of 1,6-dihydro-1,7-dimethylpyrrolo[2,3-g]indazole (Example 9) in 25 ml. of methylene chloride is added 0.30 ml. of triethylamine and 0.10 ml. of oxalyl chloride. After stirring the mixture for 30 minutes, 10 ml. of a saturated solution of dimethylamine in methylene chloride is added and stirring continued for an additional 15 minutes. The reaction mixture is washed thoroughly with water, dried over magnesium sulfate and evaporated under reduced pressure. The residue is triturated with ether-petroleum ether to give 0.108 g. of an off-white crystalline solid.

Example 37.—Preparation of 1,6-dihydro-8-(2-dimethylaminoethyl)-1,7-dimethylpyrrolo[2,3-g]indazole (XLII)

A mixture of 0.450 g. of 1,6-dihydro-N,N,1,7-tetramethylpyrrolo[2,3-g]indazole - 8-glyoxylamide (Example 36) and 0.200 g. of lithium aluminum hydride in 10 ml. of dry tetrahydrofuran is refluxed for two hours. The mixture is cooled in ice, 0.5 ml. of water is added dropwise and filtered. The filtrate is concentrated under reduced pressure to give an oily residue which is dissolved in chloroform, extracted with dilute hydrochloric acid. The acidic extracts are made alkaline with dilute sodium hydroxide and the product is collected by filtration.

Example 38.—Preparation of 5-benzoyl-1-benzyl-4-oxo-7-methyl-4,5,6,7-tetrahydroindole (XXXIII)

To a stirred solution of 1-benzyl-4-oxo-2-methyl-4,5,6,7-tetrahydroindole (III) in 25 ml. of dried tetrahydrofuran is added in portions 0.810 g. of a 50% dispersion of sodium hydride in oil, followed by the dropwise addition of 2.4 ml. of ethyl benzoate. After stirring for 65 hours, the mixture is cooled in an ice bath and 3 ml. of ethanol is cautiously added. Benzene is added and the mixture is extracted with three portions of cold 5% sodium hydroxide. The aqueous alkaline solutions are acidified and extracted with methylene chloride. The organic extract is dried over sodium sulfate and concentrated under reduced pressure to give an oily product which showed a positive ferric chloride test.

Example 39.—Preparation of 6-benzyl-2,4,5,6-tetrahydro-7-methyl-3-phenylpyrrolo[2,3-g]indazole (XXXIV)

A solution of 5-benzoyl-1-benzyl-4-oxo-2-methyl-4,5,6,7-tetrahydroindole (Example 38) obtained as an oil in the previous example and 0.50 ml. of hydrazine hydrate in 25 ml. of ethanol is heated at reflux for 2 hours. Water is added to the solution which is then evaporated under reduced pressure at room temperature until crystals begin to form. The mixture is chilled in an ice bath and the product is collected as off-white crystals.

Example 40.—Preparation of 6 - benzyl - 1,6 - dihydro-7-methyl-3-phenylpyrrolo[2,3-g]indazole (XXXV)

In the manner described in Example 2, 0.475 g. of 6-benzyl - 2,4,5,6 - tetrahydro - 7 - methyl-3-phenylpyrrolo[2,3-g]indazole (Example 39) is treated with 10% palladium-on-carbon in cumene to give colorless crystals of 6-benzyl-1,6-dihydro-7-methyl-3-phenylpyrrolo[2,3-g]indazole.

Example 41.—Preparation of 1,6 - dihydro-7-methyl-3-phenylpyrrolo[2,3-g]indazole (XXXVI)

In the manner described in Example 3, 6-benzyl-1,6-dihydro - 7-methyl-3-phenylpyrrolo[2,3-g]indazole (Example 40) is treated with sodium in liquid ammonia to give 1,6-dihydro-7-methyl-3-phenylpyrrolo[2,3-g]indazole.

Example 42.—Preparation of 6-benzyl-2,4,5,6-tetrahydropyrrolo[2,3-g]indazole (LXV)

A suspension of 4-oxo-4,5,6,7-tetrahydroindole (LXII) [Stetter & Lauterbach, Ann., 655, 20 (1962)] in dry benzene is added to a suspension of freshly prepared potassium tertiary butoxide in dry benzene. The mixture is refluxed for 2 hours and then cooled to room temperature. Benzyl chloride is added and the reaction mixture is refluxed for 17 hours. The mixture is cooled and added to water. The mixture is acidified with concentrated hydrochloric acid and extracted with methylene chloride. The organic layer is washed with brine, dried and concentrated in vacuo to give a yellow oil. The oil is thoroughly extracted with boiling water, dissolved in methylene chloride, dried and concentrated in vacuo. The residual oil crystallized on standing and is recrystallized from methylene chloride-hexane to give a crystalline solid 1-benzyl-4-oxo-4,5,6,7-tetrahydroindole, melting point 80°–81.5° C.

A mixture of 1-benzyl-4-oxo-4,5,6,7-tetrahydroindole (LXIII) dissolved in dry benzene and freshly distilled ethyl formate dissolved in dry benzene is added dropwise in a nitrogen atmosphere at 0° to a suspension of fresh sodium methoxide in dry benzene. A gum precipitates from the reaction mixture at room temperature and dissolves completely at reflux temperature. A solid precipitates from the solution after one hour at reflux. The mixture is refluxed for a total of 4 hours, cooled to 0° and then extracted with water. All the solid dissolves and the aqueous extract has a pH of 10. The aqueous extract is cooled with ice, layered with methylene chloride and acidified with concentrated hydrochloric acid to pH 1. The organic extract is washed with brine, dried and concentrated in vacuo to give a yellow substance 1-benzyl-5-hydroxymethylene-4-oxo-4,5,6,7-tetrahydroindole (LXIV) which gives a positive ferric chloride test.

A solution of 0.061 g. of 1-benzyl-5-hydroxymethylene-4-oxo-4,5,6,7-tetrahydroindole (LXIV) and 0.040 ml. of hydrazine hydrate in 5 ml. of ethanol is heated at reflux for one hour. The mixture is evaporated under reduced pressure and the resulting oil is dissolved in ether. The ether solution is washed thoroughly with water, dried over sodium sulfate and concentrated under reduced pressure. The oily residue is extracted with hot petroleum ether from which, on cooling, tan crystals, melting points 60°–65° C. separate.

Example 43.—Preparation of 1-ethyl-4-oxo-4,5,6,7-tetrahydro-2-methylindole (XXXI)

A mixture of 33 g. of 2-acetonyl-1,3-cyclohexanedione (II) [Ann., 655, 20 (1962)], 20 g. of ethyl amine and 135 ml. of methanol is heated in a steel bomb at 150° for 12 hours. The methanol is removed by evaporation at reduced pressure and the residue is treated with 200 ml. of methylene chloride and 400 ml. of water. The organic layer is washed twice with 5% sodium hydroxide solution, once with water, dried and concentrated. The crystalline residue is washed with cyclohexane containing a small amount of ether and recrystallized from cyclohexane to give 18.8 g. of 1-ethyl-4,5,6,7-tetrahydro-2-methyl-4-oxoindole, melting point 74°–75° C., $\lambda$ max. 6.15 $\mu$; 252 ($\epsilon$ 19,700), 284 ($\epsilon$ 13,600) m$\mu$.

Example 44.—Preparation of 1-ethyl-5-hydroxymethylene-2-methyl-4-oxo-4,5,6,7-tetrahydroindole (LIII)

An ice-cooled suspension of 1.08 g. of sodium methoxide in 10 ml. of dry benzene, under nitrogen is treated with a solution of 1.48 g. of ethyl formate in 5 ml. of benzene and a solution of 885 mg. of 1-ethyl-2-methyl-4-oxo-4,5,6,7-tetrahydroindole (Example 43) in 10 ml. of benzene. The mixture is stirred overnight at room temperature, cooled in an ice bath, and treated with 20 ml. of 5% sodium hydroxide solution. The benzene layer is extracted with an additional 10 ml. of 5% sodium hydroxide solution and the combined alkaline solutions are cooled in an ice-bath, layered with 20 ml. of benzene and acidified. This procedure gives 670 mg. of 1-ethyl-5-hydroxymethylene-2-methyl - 4 - oxo - 4,5,6,7 - tetrahydroindole, melting point 65°–70°; $\lambda$ max. 6.03 $\mu$. Recrystallization of this compound from methanol affords the tautomeric form 1-ethyl-5-formyl-2-methyl-4-oxo-4,5,6,7-tetrahydroindole, melting point 82°–90° C.; $\lambda$ max. 6.05, 6.15 $\mu$.

Example 45.—Preparation of 6-ethyl-2,4,5,6-tetrahydro-7-methylpyrrolo[2,3-g]indazole (LIV)

A mixture of 6.5 mg. of 1-ethyl-5-hydroxymethylene-2-methyl-4-oxo-4,5,6,7-tetrahydroindole (Example 44), 20 ml. of ethanol and 226 mg. of hydrazine hydrate is warmed on a steam bath for 1 hour and concentrated under reduced pressure. The residue is triturated with ether, affording 487 mg. of 6-ethyl-2,4,5,6-tetrahydro-7-methylpyrrolo[2,3 - g]indazole. After recrystallization from methanol this compound has melting point 87°–90° C.; $\lambda$ max. 272 m$\mu$.

Example 46.—Preparation of 1,6-dihydro-6-ethyl-7-methylpyrrolo[2,3-g]indazole (LV)

A mixture of 0.200 g. of 6-ethyl-2,4,5,6-tetrahydro-7-methylpyrrolo[2,3-g]indazole (Example 45) and 0.100 g. of 10% palladium-on-carbon in 10 ml. of cumene is heated at reflux for two hours. The mixture is filtered through diatomaceous earth while hot and the filtrate is evaporated under reduced pressure. Crystallization from acetone-hexane affords 1,6-dihydro-6-ethyl-7-methylpyrrolo[2,3-g]indazole as colorless crystals.

Example 47.—Preparation of 2,6-dimethyl-1-ethyl-4-oxo-4,5,6,7-tetrahydroindole (LVII)

In the manner described in Example 43 treatment of 2 - acetonyl - 5 - methyl-1,3-cyclohexanedione (LVI) prepared [as described in Ann., 655, 20 (1962)] with ethylamine gives white needles, melting point 77°–79° C.

Example 48.—Preparation of 2,6-dimethyl-1-ethyl-5-hydroxymethylene-4-oxo-4,5,6,7-tetrahydroindole (LVIII)

Following the procedure described in Example 44 and treating 2,6-dimethyl-1-ethyl-4-oxo-4,5,6,7 - tetrahydroindole (Example 47) with ethyl formate gives greyish needles of the desired product, melting point 71°–74° C.

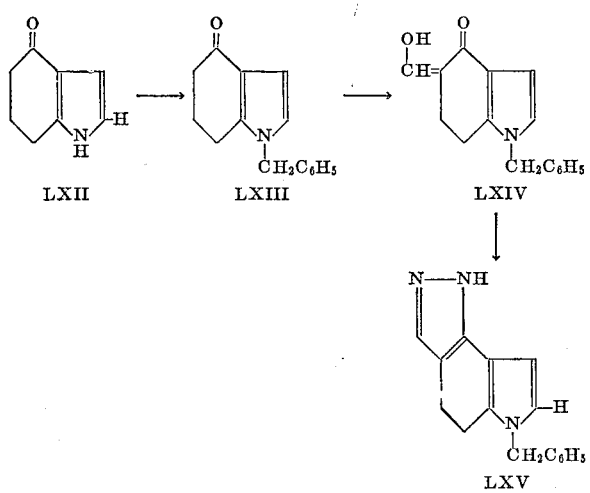

Example 49—Preparation of 4,7-dimethyl-6-ethyl-2,4,5,6-tetrahydropyrrolo[2,3-g]indazole (LIX)

A solution of 1.3 g. of 2,6-dimethyl-1-ethyl-5-hydroxymethylene-4-oxo-4,5,6,7-tetrahydroindole (Example 48) and 0.30 ml. of hydrazine hydrate is heated at reflux for 2 hours. Water is added and the solution is evaporated under reduced pressure until crystals begin to form. The solution is cooled in an ice bath and the product is collected as 1.7 g. of white crystals.

Example 50.—Preparation of 1,6-dihydro-4,7-dimethyl-6-ethylpyrrolo[2,3-g]indazole (LX)

A mixture of 0.700 g. of 4,7-dimethyl-6-ethyl-2,4,5,6-tetrahydropyrrol[2,3-g]indazole (Example 49) and 0.200 g. of 10% palladium-on-carbon in 15 ml. of cumene is stirred and heated at reflux for 2 hours. The mixture is filtered while hot and the filtrate evaporated under reduced pressure. The residue is crystallized from acetone-hexane to give colorless crystals.

Example 51.—Preparation of 6-acetyl-1,6-dihydro-1,7-dimethylpyrrolo[2,3-g]indazole (XLVIII)

In the manner described in Example 11, 0.500 g. of 1,6-dihydro-1,7-dimethylpyrrolo[2,3-g]indazole (Example 9) is treated with sodium hydride and acetyl chloride to give colorless prisms, melting point 173°–175° C.

We claim:
1. The compound 1,6-dihydro-7-methylpyrrolo[2,3-g]indazole.
2. The compound 1,6-dihydro-8-formyl-7-methylpyrrolo[2,3-g]indazole.
3. The compound 1,6-dihydro-7,8-dimethylpyrrolo[2,3-g]indazole.
4. The compound 6-benzyl-1,4,5,6-tetrahydro-1,7-dimethylpyrrolo[2,3-g]indazole.
5. The compound 6-benzyl-1,6-dihydro-1,7-dimethylpyrrolo[2,3-g]indazole.
6. The compound 1,6-dihydro-1,7-dimethylpyrrolo[2,3-g]indazole.
7. The compound 6-benzyl-1,6-dihydro-N,N,1,7-tetramethylpyrrolo[2,3-g]indazole-8-glyoxylamide.
8. The compound 3-amino-6-benzyl-1,4,5,6-tetrahydro-7-methylpyrrolo[2,3-g]indazole.
9. The compound 3-amino-6-benzyl-1,6-dihydro-7-methylpyrrolo[2,3-g]indazole.
10. The compound 3-amino-1,6-dihydro-7-methylpyrrolo[2,3-g]indazole.
11. The compound 6-benzyl-8-dimethylaminomethyl-1,6-dihydro-7-methylpyrrolo[2,3-g]indazole.
12. The compound 2-acetyl-2,6-dihydro-7-methylpyrrolo[2,3-g]indazole.
13. The compound 2-benzoyl-2,6-dihydro-7-methylpyrrolo[2,3-g]indazole.
14. The compound 7-methylpyrrolo[2,3-g]indazole-2(6H) carboxamide.
15. The compound 8-dimethylaminomethyl-1,6-dihydro-7-methylpyrrolo[2,3-g]indazole.
16. The compound 6-ethyl-2,4,5,6-tetrahydro-7-methylpyrrolo[2,3-g]indazole.
17. The compound 6-benzyl-1,4,5,6-tetrahydro-7-methyl-1-phenylpyrrolo[2,3-g]indazole.
18. The compound 6-benzyl-1,6-dihydro-7-methyl-1-phenylpyrrolo[2,3-g]indazole.
19. The compound 1,6-dihydro-7-methyl-1-phenylpyrrolo[2,3-g]indazole.

References Cited

Decennial Index to Chemical Abstracts, volumes 21–30, 1927–1936, Subject Index P–Z, QDI. A51.

The Ring Index, 2nd ed. pp. 307 and 309, Wash., D.C., Amer. Chem. Soc., 1960, QD 291.P3.

The Ring Index Supplement III to the 2nd ed. p. 124, Wash., D.C., Amer. Chem. Soc., 1965, QD 291.P3.

HENRY R. JILES, *Primary Examiner.*

NATALIE TROUSOF, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,157            October 1, 1968

Francis Joseph McEvoy et al.

It is certified that error appears in the above identified patent and that said Letters Patent are hereby corrected as shown below:

Column 5, the formula (VIII) should appear as shown below:

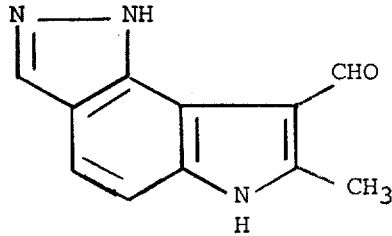

Signed and sealed this 17th day of March 1970.

(SEAL)
Attest:

Edward M. Fletcher, Jr.       WILLIAM E. SCHUYLER, JR.
Attesting Officer           Commissioner of Patents